(12) United States Patent
Huang

(10) Patent No.: US 9,158,646 B2
(45) Date of Patent: Oct. 13, 2015

(54) ABNORMAL INFORMATION OUTPUT SYSTEM FOR A COMPUTER SYSTEM

(71) Applicant: Celestica Technology Consultancy (Shanghai) Co., Ltd., Shanghai (CN)

(72) Inventor: Zhirong Huang, Shanghai (CN)

(73) Assignee: Celestica Technology Consultancy (Shanghai) Co., Ltd., Shanghai (CN)

( * ) Notice: Subject to any disclaimer, the term of this patent is extended or adjusted under 35 U.S.C. 154(b) by 231 days.

(21) Appl. No.: 13/907,611

(22) Filed: May 31, 2013

(65) Prior Publication Data

US 2014/0359377 A1    Dec. 4, 2014

(51) Int. Cl.
*G06F 11/00* (2006.01)
*G06F 11/30* (2006.01)

(52) U.S. Cl.
CPC ........ *G06F 11/3058* (2013.01); *G06F 11/3089* (2013.01)

(58) Field of Classification Search
CPC ............ G06F 11/1417; G06F 11/3058; G06F 11/2278; G06F 11/2284; G06F 11/3089
See application file for complete search history.

(56) References Cited

U.S. PATENT DOCUMENTS

| | | | | |
|---|---|---|---|---|
| 6,772,099 B2* | 8/2004 | Merkin et al. | ................ | 702/188 |
| 7,269,534 B2* | 9/2007 | Mugunda et al. | ............. | 702/182 |
| 7,594,144 B2* | 9/2009 | Brandyberry et al. | .......... | 714/43 |
| 8,725,923 B1* | 5/2014 | Frangioso et al. | ............ | 710/306 |
| 2009/0309745 A1* | 12/2009 | Johnson | ........................ | 340/635 |
| 2010/0332189 A1* | 12/2010 | Urmanov et al. | ............. | 702/186 |
| 2012/0068985 A1* | 3/2012 | Tsai et al. | ..................... | 345/211 |
| 2013/0151746 A1* | 6/2013 | Tu | ................................. | 710/306 |

* cited by examiner

*Primary Examiner* — Joseph Kudirka
(74) *Attorney, Agent, or Firm* — Novick, Kim & Lee, PLLC; Jae Youn Kim

(57) ABSTRACT

Provided is an abnormal information output system for a computer system, wherein the computer system includes at least a plurality of hardware devices and a plurality of sensors for detecting operation statuses of each hardware device. The abnormal information output system includes at least a latch module connected to each of the sensors and the hardware devices, wherein the latch module is configured to latch operation status information of the hardware devices when abnormal operation of the computer system is detected; and a basic input-output system (BIOS) module embedded in the computer system and the BIOS module is connected to the latch module and configured to analyze the latched operation status information when the computer system returns to a normal operation so as to output corresponding abnormal information. Accordingly, the computer system is capable of recording a chip failure and information regarding reasons for system failure.

20 Claims, 2 Drawing Sheets

ABNORMAL INFORMATION OUTPUT SYSTEM FOR A COMPUTER SYSTEM

BACKGROUND OF THE INVENTION

The present invention relates generally to computers, and more particularly, to an abnormal information output system for a computer system.

Concerning the cost issue, some of the conventional computer systems provides no baseboard management controller (BMC sub-system) but use a microprocessor to substitute the BMC sub-system for management, for example, recording operation status information like temperatures of hardware and chips in the computer systems.

However, the microprocessor may not be used to record the operation status information of the system in case the microprocessor fails. More particularly, if some abnormal events (for example, overheating of a CPU chip) occur, the computer system would fail. Under this circumstance, information of the above-mentioned abnormal events cannot be recorded by the microprocessor, and inspectors may thus fail to determine the causes of such abnormal events which occur in the system. For the above reasons, it is desired to cure such deficiencies in the conventional computer systems.

BRIEF SUMMARY OF THE INVENTION

Examples of the present invention may provide an abnormal information output system for a computer system, the computer system comprising at least a plurality of hardware devices and a plurality of sensors for detecting operation statuses of the hardware devices, the abnormal information output system comprising at least a latch module connected to each of the sensors and the hardware devices, being configured for latching operation status information of the hardware devices during an abnormal operation when the abnormal operation of the computer system is detected; and a basic input-output system (BIOS) module embedded in the computer system and connected to the latch module, being configured for analyzing the latched operation status information when the computer system returns to a normal operation so as to output corresponding abnormal information.

Some examples of the present invention may provide an abnormal information output system for a computer system, the computer system comprising at least a plurality of hardware devices and a plurality of sensors for detecting operation statuses of the hardware devices, the abnormal information output system comprising at least a latch module connected to each of the sensors and the hardware devices, being configured for acquiring operation status information of the hardware devices in real time; and detecting an abnormal operation of the computer system and latching the operation status information of the computer system and the hardware devices during the abnormal operation when the abnormal operation of the computer system is detected, and a basic input-output system (BIOS) module embedded in the computer system and connected to the latch module, being configured for: reading the latched operation status information after the computer system returns to a normal operation; and analyzing the latched operation status information based on pre-stored operation status information corresponding to the normal operation of the computer system so as to output corresponding abnormal information.

Still other examples of the present invention may provide an abnormal information output system for a computer system, the computer system comprising at least a plurality of hardware devices and a plurality of sensors for detecting operation statuses of the hardware devices, the abnormal information output system comprising at least: an acquiring unit connected to each of the sensors and the hardware devices, being configured for acquiring operation status information of the hardware devices in real time; a latch unit connected to the acquiring unit, being configured for detecting an abnormal operation of the computer system and latching operation status information of the hardware devices and the computer system during the abnormal operation when the abnormal operation of the computer system is detected; a reading unit connected to the latch unit, being configured for reading the latched operation status information from the latch unit after the computer system returns to a normal operation; and an analyzing unit connected to the reading unit, being configured for receiving the latched operation status information from the reading unit, and analyzing the latched operation status information based on pre-stored operation status information corresponding to the normal operation of the computer system so as to output corresponding abnormal information.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
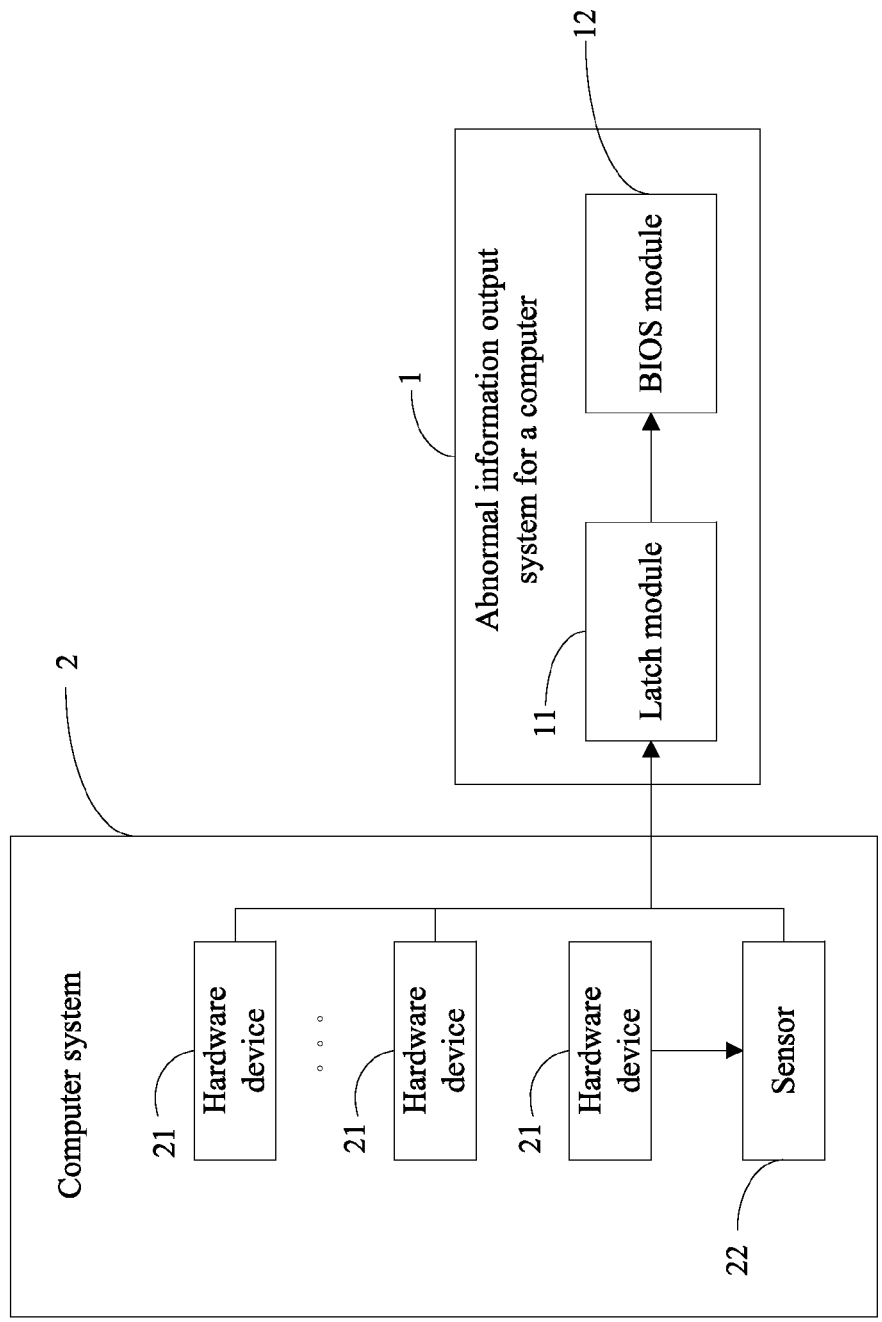
FIG. 1 is a schematic block diagram illustrating a structure of an abnormal information output system for a computer system in accordance with an example of the present invention.

FIG. 1 is a schematic block diagram illustrating a structure of an abnormal information output system 1 for a computer system 2 in accordance with an example of the present invention. Referring to FIG. 1, the abnormal information output system 1 includes a latch module 11 and a basic input-output system (BIOS) module 12. Furthermore, the computer system 2 includes at least a plurality of hardware devices 21 and sensors 22 for detecting operation status of each of the hardware devices 21. Preferably, the hardware devices 21 include but not limited to a display module, an input-output (IO) chip, a central processing unit (CPU) chip, a fan module, a peripheral component interconnect (PCI) module, a memory module, a hard disk and optical disk driving module, a power supply module, etc.

The latch module 11 which is connected to each of the sensors 22 and the hardware devices 21, is configured for latching operation status information of abnormal hardware devices 21 when an abnormal operation of the computer system 2 is detected.

Figure 2:
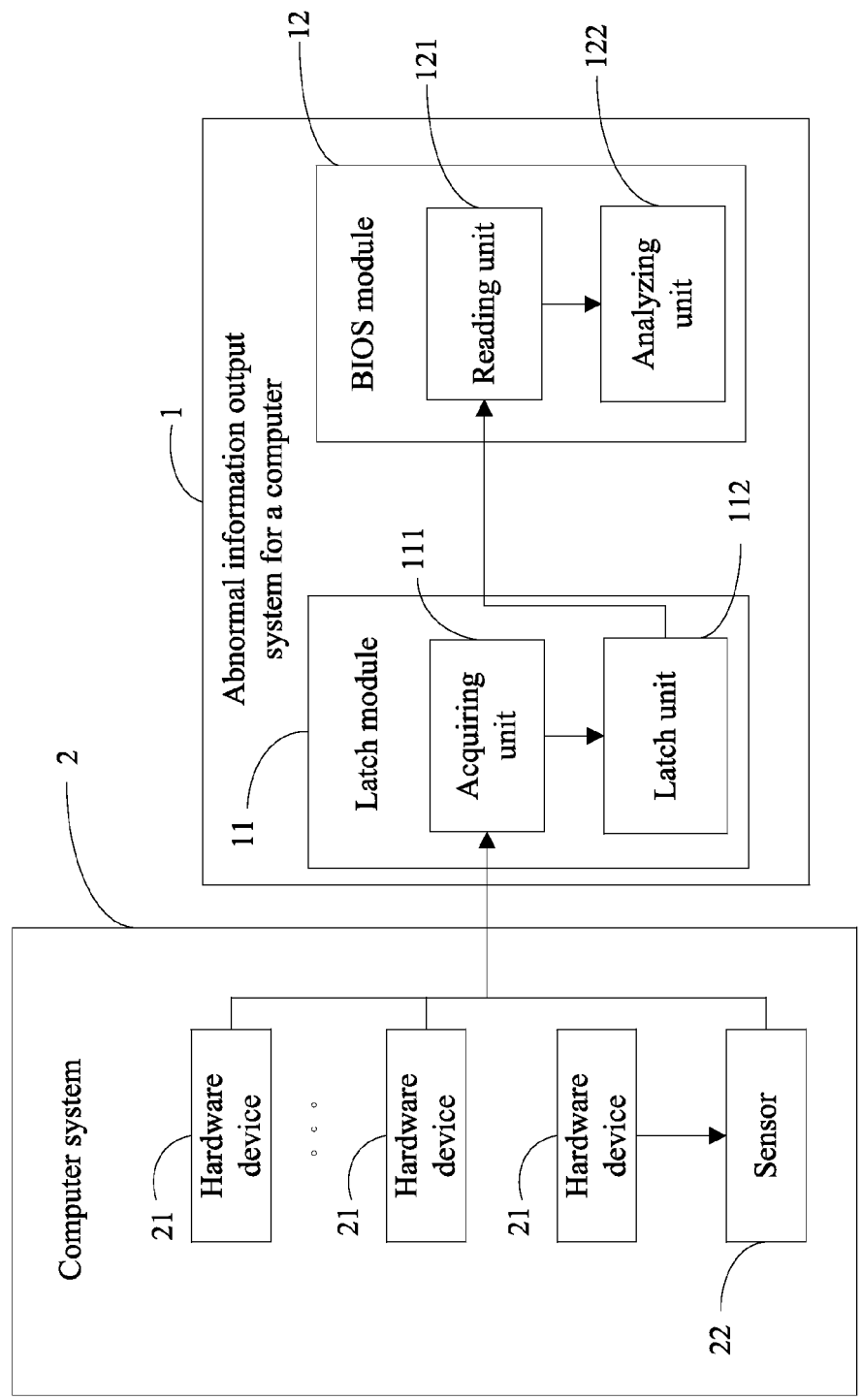
FIG. 2 is a schematic block diagram illustrating a structure of an abnormal information output system for a computer system in accordance with another example of the present invention.

FIG. 2 is a schematic block diagram illustrating a structure of an abnormal information output system 1 for a computer system 2 in accordance with another example of the present invention. Referring to FIG. 2, specifically, the latch module 11 includes an acquiring unit 111 and a latch unit 112. The acquiring unit 111 which is connected to each of the sensors 22 and the hardware devices 21, is configured for acquiring operation status information of the hardware devices 21 in real time. The operation status information includes any status information of the hardware devices 21 as the computer system 2 operates, for example, temperature of the CPU of the computer system 2, output voltage level(s) of pin(s) of the CPU chip, output voltage of the power supply module, and output voltage level(s) of pin(s) of the IO chip, etc.

Methods of acquiring current operation status information of the computer system 2 include but not limited to the following:

(1) The operation status information is provided by the sensors 22 which sense the operation statuses of the hardware devices 21 of the computer system 2. For example, the temperature information of the CPU is provided by a temperature sensor which senses the temperature of the CPU chip.

(2) The operation status information is directly provided by the hardware devices 21 of the computer system 2. In one example, the acquiring unit 111 is directly connected to an output terminal of the power supply module of the computer system 2, so that the output voltage of the power supply module can be acquired by the acquiring unit 111. In another example, the acquiring unit 111 is directly connected to the pin(s) of the IO chip of the computer system 2, so that the output voltage level(s) of the pin(s) of the IO chip can be acquired by the acquiring unit 111.

It shall be appreciated that, the above-mentioned methods of acquiring operation status information of the computer system 2 are only illustrative but not intended to limit the present invention. Actually, any methods of acquiring operation status information of the computer system 2 are covered within the scope of the present invention.

The latch unit 112 which is connected to the acquiring unit 111, is configured for detecting the abnormal operation of the computer system 2 and latching the operation status information of each of the hardware devices 21 during abnormal operation. The abnormal operation of the computer system 2 includes any conditions in which the computer system 2 fails to operate normally. More particularly, the above-mentioned abnormal operation preferably includes but not limited to a crash of the computer system 2, automatically rebooting of the computer system 2 and displaying blue color on the screen, etc. Furthermore, preferably, the latch module 11 includes any modules which are capable of latching the operation status information outputted by the hardware devices 21 and the sensors 22. More preferably, the latch module 11 includes any chips or digital circuits capable of latching a voltage level transition signal, which include but not limited to a PCA9535 chip.

Specifically, methods of detecting the abnormal operation of the computer system 2 by the latch unit 112 include but not limited to detecting whether the computer system 2 operates abnormally based on abnormal signals outputted by each of the hardware devices 21. For example, the latch unit 112 determines the abnormal operation of the computer system 2 based on the acquired voltage level transition signal(s) outputted by the pin(s) of the CPU chip.

Methods of latching the operation status information of the computer system 2 during the abnormal operation, which are performed by the latch unit 112, include but not limited to the following:

(1) Latching the acquired operation status information of each of the hardware devices 21 during abnormal operation of the computer system 2. For example, based on transition signal(s) outputted by the pin(s) of the CPU chip, the latch unit 112 determines that the computer system 2 operates abnormally. Meanwhile, the latch unit 112 deems the currently acquired operation status information, such as the temperature value provided by the temperature sensor which detects the temperature of the CPU and the output voltage provided by the power supply module, as the operation status information of the abnormally operated computer system 2. Then, the acquired operation status information is latched by the latch unit 112.

(2) Latching the operation status information of the hardware devices 21 based on the acquired abnormal signals of the hardware devices 21. For example, based on the acquired voltage level transition signal(s) transitioning from a low voltage level to a high voltage level that is/are outputted by the pin(s) of the IO chip, the latch unit 112 determines that the computer system 2 operates abnormally. Then, the high voltage level signal(s) currently outputted by the pin(s) of the IO chip is deemed as the operation status information of the computer system 2 during the abnormal operation, and the above-mentioned operation status information is latched by the latch unit 112.

The BIOS module 12 which is embedded in the computer system 2 and connected to the latch module 11, is configured for analyzing the latched operation status information when the computer system 2 returns to a normal operation, so as to output corresponding abnormal information.

Preferably, as shown in FIG. 2, the BIOS module 12 includes a reading unit 121 and an analyzing unit 122. The reading unit 121 which is connected to the acquiring unit 111, is configured for reading the latched operation status information after the computer system 2 returns to the normal operation. For example, the reading unit 121 reads the latched operation status information of each of the hardware devices 21 during the normal self-checking process of the computer system 2.

The analyzing unit 122 which is connected to the reading unit 121, is configured for analyzing the latched operation status information based on pre-stored corresponding normal operation status information, so as to determine abnormal information. For example, by comparing the latched CPU temperature information and the pre-stored normal CPU temperature threshold, the analyzing unit 122 determines whether the abnormal information indicates overheating of the CPU. Furthermore, the analyzing unit 122 records the abnormal information in a malfunction log of the computer system 2, so as to facilitate the BIOS module outputting the abnormal information to the display module of the computer system 2.

From the above, by latching operation status information of each of the hardware devices 21 during the abnormal operation of the computer system 2, the abnormal information output system 1 for a computer system 2 of the present invention can overcome an issue of the conventional computer system that, information of the cause for malfunction of the chip and system cannot be recorded due to abnormal operation of the system software or sudden crash of the system. Furthermore, the cause of the abnormal operation of the computer system 2 can be determined by analyzing the latched operation status information of the computer system 2. Thereby, professionals can accurately and rapidly diagnose the issues of the hardware or chip in the computer system 2. Moreover, the present invention features a low cost as compared with the conventional computer system that adopts the BMC sub-system to record the operation status information of the computer system. Therefore, the present invention significantly overcomes various shortcomings in the prior art and thus achieves a high value for the industry.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. An abnormal information output system for a computer system, the computer system comprising at least a plurality of hardware devices and a plurality of sensors for detecting operation statuses of the hardware devices, the abnormal information output system comprising at least:
   a latch module connected to each of the sensors and the hardware devices, being configured for latching operation status information of the hardware devices during an abnormal operation of the computer system when the abnormal operation of the computer system is detected; and
   a basic input-output system (BIOS) module embedded in the computer system and connected to the latch module, being configured for analyzing the latched operation status information when the computer system returns to a normal operation so as to output corresponding abnormal information,
   wherein the latch module further comprises a latch unit, the latch unit determining that the computer system operates abnormally based on a transition signal(s) outputted by a pin(s) of a central processing unit (CPU) chip or based on an acquired voltage level transition signal(s) transitioning from a low voltage level to a high voltage level that is/are outputted by pin(s) of an input-output (IO) chip.

2. The abnormal information output system of claim 1, wherein the latch module comprises:

an acquiring unit connected to each of the sensors and the hardware devices, being configured for acquiring operation status information of the hardware devices in real time,
wherein the latch unit connected to the acquiring unit is configured for detecting the abnormal operation of the computer system and latching operation status information of the computer system during the abnormal operation.

3. The abnormal information output system of claim 2, wherein the BIOS module comprises:
   a reading unit connected to the latch module, being configured for reading the latched operation status information of the hardware devices after the computer system returns to the normal operation; and
   an analyzing unit connected to the reading unit, being configured for analyzing the latched operation status information of the hardware devices based on pre-stored operation status information corresponding to the normal operation of the computer system so as to output corresponding abnormal information.

4. The abnormal information output system of claim 1, wherein the latch module comprises a chip or a digital circuit, the chip and the digital circuit both capable of latching a voltage level transition signal.

5. The abnormal information output system of claim 4, wherein the latch module comprises a PCA9535 chip.

6. The abnormal information output system of claim 1, wherein the hardware devices comprise at least one of a display module, the input-output (IO) chip, the central processing unit (CPU) chip, a fan module, a peripheral component interconnect (PCI) module, a memory module, a hard disk and optical disk driving module, and a power supply module.

7. The abnormal information output system of claim 6, wherein the sensors comprise a temperature sensor configured for sensing a temperature of the CPU chip.

8. The abnormal information output system of claim 7, wherein the acquiring unit is configured for acquiring at least one of an output voltage of an output terminal of the power supply module and an output voltage level(s) of the pin(s) of the IO chip in real time.

9. The abnormal information output system of claim 8, wherein the operation status information of the hardware devices comprises at least one of the temperature of the CPU chip, the output voltage of the output terminal of the power supply module, and the output voltage level(s) of the pin(s) of the TO chip.

10. An abnormal information output system for a computer system, the computer system comprising at least a plurality of hardware devices and a plurality of sensors for detecting operation statuses of the hardware devices, the abnormal information output system comprising at least:
    a latch module connected to each of the sensors and the hardware devices, being configured for:
    acquiring operation status information of the hardware devices in real time, and
    detecting an abnormal operation of the computer system and latching operation status information of the computer system and the operation status information of the hardware devices during the abnormal operation of the computer system when the abnormal operation of the computer system is detected; and
    a basic input-output system (BIOS) module embedded in the computer system and connected to the latch module, being configured for:

reading the latched operation status information of the hardware devices after the computer system returns to a normal operation, and analyzing the latched operation status information of the hardware devices based on pre-stored operation status information corresponding to the normal operation of the computer system so as to output corresponding abnormal information, wherein the latch module further comprises a latch unit, the latch unit determining that the computer system operates abnormally based on a transition signal(s) outputted by a pin(s) of a central processing unit (CPU) chip or based on an acquired voltage level transition signal(s) transitioning from a low voltage level to a high voltage level that is/are outputted by pin(s) of an input-output (IO) chip.

11. The abnormal information output system of claim 10, wherein the latch module comprises a chip or a digital circuit, the chip and the digital circuit both capable of latching a voltage level transition signal.

12. The abnormal information output system of claim 11, wherein the latch module comprises a PCA9535 chip.

13. The abnormal information output system of claim 10, wherein the hardware devices comprise at least one of a display module, the input-output (TO) chip, the central processing unit (CPU) chip, a fan module, a peripheral component interconnect (PCI) module, a memory module, a hard disk and optical disk driving module, and a power supply module.

14. The abnormal information output system of claim 13, wherein the operation status information of the hardware devices comprises at least one of a temperature of the CPU chip, an output voltage of the power supply module, and an output voltage level(s) of the IO chip.

15. An abnormal information output system for a computer system, the computer system comprising at least a plurality of hardware devices and a plurality of sensors for detecting operation statuses of the hardware devices, the abnormal information output system comprising at least:

an acquiring unit connected to each of the sensors and the hardware devices, being configured for acquiring operation status information of the hardware devices in real time;

a latch unit connected to the acquiring unit, being configured for detecting an abnormal operation of the computer system and latching operation status information of the hardware devices and the computer system during the abnormal operation of the computer system when the abnormal operation of the computer system is detected;

a reading unit connected to the latch unit, being configured for reading the latched operation status information of the hardware devices from the latch unit after the computer system returns to a normal operation; and an analyzing unit connected to the reading unit, being configured for receiving the latched operation status information of the hardware devices from the reading unit, and analyzing the latched operation status information of the hardware devices based on pre-stored operation status information corresponding to the normal operation of the computer system so as to output corresponding abnormal information, wherein the latch unit determines that the computer system operates abnormally based on a transition signal(s) outputted by a pin(s) of a central processing unit (CPU) chip or based on an acquired voltage level transition signal(s) transiting transitioning from a low voltage level to a high voltage level that is/are outputted by pin(s) of an input output (IO) chip.

16. The abnormal information output system of claim 15, wherein the hardware devices comprise at least one of a display module, the input-output (TO) chip, the central processing unit (CPU) chip, a fan module, a peripheral component interconnect (PCI) module, a memory module, a hard disk and optical disk driving module, and a power supply module.

17. The abnormal information output system of claim 16, wherein the sensors comprise a temperature sensor configured for sensing a temperature of the CPU chip.

18. The abnormal information output system of claim 17, wherein the acquiring unit is configured for acquiring at least one of an output voltage of an output terminal of the power supply module and an output voltage level(s) of the pin(s) of the IO chip in real time.

19. The abnormal information output system of claim 18, wherein the operation status information of the hardware devices comprises at least one of the temperature of the CPU chip, the output voltage of the output terminal of the power supply module, and the output voltage level(s) of the pin(s) of the IO chip.

20. The abnormal information output system of claim 19, wherein the analyzing unit is configured for comparing the latched operation status information of the hardware devices with pre-stored operation status information of the hardware devices corresponding to normal operation.

* * * * *